May 9, 1944.  W. R. WEEMS  2,348,235
ERECTING DEVICE FOR DIRECTIONAL GYROSCOPES
Filed May 13, 1943
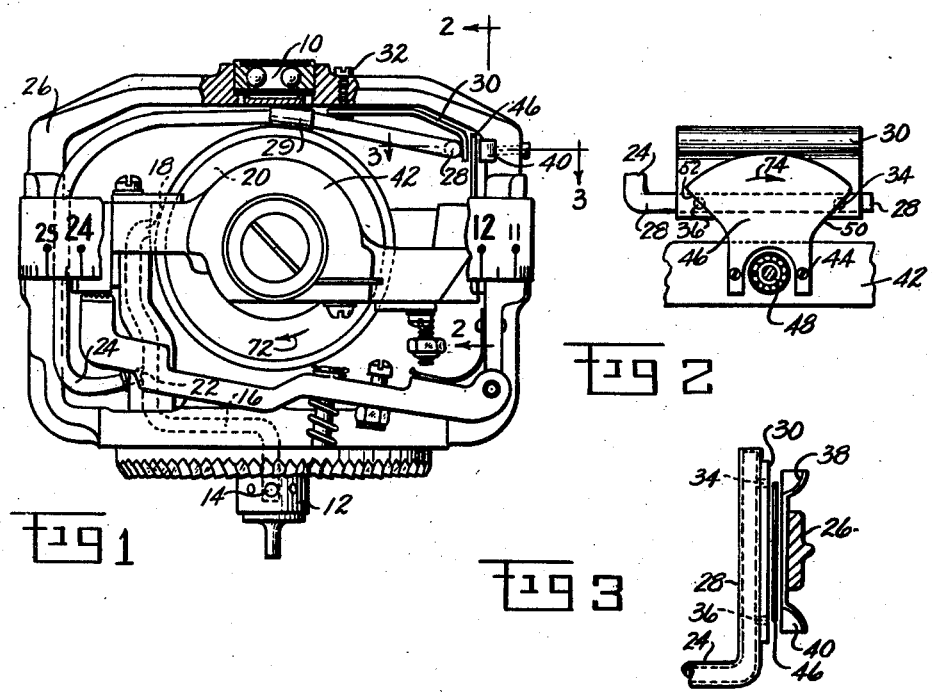
INVENTOR
WILLIAM R. WEEMS
BY
ATTORNEYS Patented May 9, 1944

2,348,235

UNITED STATES PATENT OFFICE 2,348,235

ERECTING DEVICE FOR DIRECTIONAL GYROSCOPES

William R. Weems, Decatur, Ga.

Application May 13, 1943, Serial No. 486,808

1 Claim. (Cl. 74—5)

(Granted under the act of March 3, 1883, as amended April 30, 1928; 370 O. G. 757)

The invention described herein may be manufactured and used by or for Government for governmental purposes, without the payment to me of any royalty thereon.

This invention relates generally to directional gyroscopes, and more particularly, to mechanism for neutralizing the precessing effect on the rotor occasioned by certain small torques acting about the axis of the gyroscope, about which directional sensings are taken.

Gyroscopes of this class are usually gimbally suspended in such a way that the spin axle is supported by one gimbal, usually called the inner gimbal, this gimbal being supported by a second gimbal, usually called the outer gimbal, which is in turn pivotally supported in a fixed support or housing. In this gimbal system the pivot axes of the inner and outer gimbals are normally perpendicular to each other, and the spin axle of the rotor is normally perpendicular to the pivot axis of the inner gimbal.

In a gyroscope of this character, it is desirable that the spinning axis be maintained in a substantially fixed direction with respect to the outer gimbal pivot axis, it usually being maintained in perpendicular relation thereto, and since the inner gimbal freedom is usually less than ninety degrees, it may happen that small torques, such as may be created and applied about the pivot axis of the outer gimbal upon a turn of the plane, will tumble the inner gimbal, and with it the spin axis, away from its proper position. This condition, of course, limits the angular freedom of maneuver of a plane equipped with the device.

It is therefore one object of this invention to provide means for positively erecting the gyroscope, when these small torques act about the axis of the outer gimbal, in order to prevent undesirable departure of the inner gimbal from its proper position.

More specifically, it is an object of the invention to provide air pressure means which utilizes the reaction torque of one or the other of two opposing jets arranged on the outer gimbal for creating torques thereon equal and opposite to those which it is desired to neutralize, valving means being operated by off position of the inner gimbal, but without applying any appreciable torque to the inner gimbal, whereby correction is due to precession of the rotor about the inner gimbal pivot due to torque applied about the outer gimbal pivot axis.

I am aware that erecting devices to overcome these difficulties have been proposed and used, and that some of them employ the reaction of several air jets to furnish the erecting force. The particular structure of my device, however, has advantages which will become self-evident as the invention is further described.

By way of illustration only, I have embodied my invention in a directional gyroscope, such as is commonly used on aircraft. In these gyroscopes, the spin axle is normally, although not necessarily, horizontal, the axis of the inner gimbal being normal to the spin axle and preferably, although not necessarily, in the same plane, and the axis of the outer gimbal being preferably, although not necessarily, vertical. This embodiment is shown in the drawing, wherein.

Fig. 1 is a side elevation of my improved device;

Fig. 2 is a fragmentary sectional view taken at 2—2 of Fig. 1;

Fig. 3 is a fragmentary sectional view taken at 3—3 of Fig. 1;

Like reference characters refer to like parts throughout the several views.

Referring to the drawing, it will be seen that the housing customarily provided for enclosing the gyro has been omitted. It will be understood, however, that the housing is conventional, and that pivoting means are contained therein for the upper vertical bearing 10 and the lower vertical bearing 12. The air pressure for operating the rotor may be positive or negative, the air moving in through the openings 14, passing through the tube 16 to the nozzle 18, which is directed at the buckets of the rotor 20 for revolving the rotor.

The tube 16 is tapped at 22, a branch 24 being carried around the periphery of the outer gimbal 26. At the upper end, the tube 24 is bent at right angles, as at 28, the bent end being fastened to a bracket 30 which is attached by a screw 32 to the outer gimbal 26. The tube 24 may preferably be made in two parts and connected by a flexible sleeve 29 in order that the several parts may be assembled more easily.

Extending through both the bracket 30 and the bent end 28 of the tube, are a pair of spaced apart nozzles 34 and 36, and opposite these nozzles, also carried on the outer gimbal, are a pair of curved deflectors 38 and 40. The deflectors 38 and 40 may be formed of a single piece of sheet metal and attached to the inner face of the outer gimbal 26. The deflectors are so spaced that air emanating from the nozzles 34 and 36 is turned substantially at right angles to the nozzles.

Secured to the outside of the inner gimbal 42 by screws 44 (see Fig. 2) is a valve plate 46, whereby the valve plate is rocked about the axis 48 of the inner gimbal when the inner gimbal tilts away from its level position. The edges 50 and 52 of the valve plate may preferably follow radial lines drawn from the axis 48, the edges being angularly so spaced that the edges of the plate cover about half of each end of the two nozzles 34 and 36. It will be seen that rocking of the valve plate 46 about the axis 48 will open one of the nozzles more as the other is being closed, without, however, applying any torque to the gimbal 42 about the axis 48.

The arrangement is, of course, such that the torques about the vertical axis, created by the air jets just described, act oppositely of the friction torques which precessed the rotor axle from its horizontal plane, causing opposite precession to return the rotor axle to the horizontal plane, without, however, creating any torque on the inner gimbal.

It should be noted that as long as the craft on which the gyro is mounted turns neither to the right nor left, no torque is apt to be applied about the vertical axis of the outer gimbal. However, when the plane makes a turn, the housing (not shown) turns with it, and, inasmuch as there must be some slight friction between the bearings of the outer gimbal and the pivots of the housing, there is slight tendency for the outer gimbal to turn with the housing.

If the rotor is revolving in the direction of the arrow 72 and the craft makes a turn to the right, that is, clockwise, viewed from above, the slight friction in the bearings of the vertical axis will cause the outer gimbal to slightly follow the housing, thereby applying a slight torque to the outer gimbal 26 about its vertical axis, which will cause the gyro to precess, tilting the rotor axis from its horizontal plane, which turns the inner gimbal about the axis 48 clockwise, that is, in the direction of the arrow 74 (see Fig. 2), thereby rocking the valve plate 46 clockwise, which will cause the opening 36 to increase and the opening 34 to decrease, whereby a larger stream of air strikes the deflector 40 and a lesser stream the deflector 38. A torque is thus created tending to rotate the outer gimbal anticlockwise about its vertical axis, which causes the rotor axle to precess back to its level position where the reacting torques of the two deflectors 38 and 40 are equal and opposite.

It is noted that in the embodiment of the invention herein shown the reaction of the air nozzles creates no torque on the inner gimbal, the return of the inner gimbal to level position being affected by the precession due to a torque about the vertical axis of the outer gimbal.

Having thus described my invention, I claim:

In a directional gyroscope of the class in which the rotor axle has its bearings in an inner gimbal which normally holds said axle in a horizontal plane, the pivot axis of said inner gimbal being normal to the rotor axle and in the same plane, said inner gimbal being rotatable about its pivot axis on bearings carried in an outer gimbal which has its pivot axis vertical, an erecting device for correcting tilting of the rotor axle away from the horizontal plane, comprising a pair of air nozzles fixed to the outer gimbal out from its pivot axis parallel to, and on opposite sides of, the inner gimbal pivot axis, a pair of deflectors fixed to the outer gimbal, in alignment with said nozzles and somewhat away from the ends of said nozzles, and formed to deflect air emanating from said nozzles in opposite directions and substantially at right angles to the direction of said nozzles, and a valve plate carried by said inner gimbal and swingable by the tilting of said inner gimbal between the ends of said nozzles and said deflectors, the valve plate being of such width that its edges will normally cover equal parts of the ends of said nozzles when said inner gimbal is not tilted from its horizontal plane.

WILLIAM R. WEEMS.